(12) United States Patent
Horio (10) Patent No.: US 9,431,178 B2
(45) Date of Patent: Aug. 30, 2016

(54) SOLID ELECTROLYTIC CAPACITOR AND METHOD OF PRODUCING SAME

(75) Inventor: Kazutoyo Horio, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 355 days.

(21) Appl. No.: 14/004,805

(22) PCT Filed: Mar. 8, 2012

(86) PCT No.: PCT/JP2012/055907
§ 371 (c)(1),
(2), (4) Date: Sep. 12, 2013

(87) PCT Pub. No.: WO2012/124584
PCT Pub. Date: Sep. 20, 2012

(65) Prior Publication Data
US 2013/0342966 A1   Dec. 26, 2013

(30) Foreign Application Priority Data

Mar. 15, 2011   (JP) .................. 2011-056500

(51) Int. Cl.
| | |
|---|---|
| H01G 9/15 | (2006.01) |
| H01G 9/012 | (2006.01) |
| H01G 9/00 | (2006.01) |
| H01G 9/004 | (2006.01) |
| H01G 4/06 | (2006.01) |
| H01G 5/013 | (2006.01) |
| H01G 9/042 | (2006.01) |
| H01G 9/045 | (2006.01) |
| H01G 9/028 | (2006.01) |
| H01G 9/052 | (2006.01) |
| H01G 9/07 | (2006.01) |

(52) U.S. Cl.
CPC ............ *H01G 9/004* (2013.01); *H01G 9/0029* (2013.01); *H01G 9/028* (2013.01); *H01G 9/052* (2013.01); *H01G 9/07* (2013.01); *H01G 9/15* (2013.01); *Y10T 29/417* (2015.01)

(58) Field of Classification Search
CPC ........ H01G 9/15; H01G 9/012; H01G 9/155; H01G 9/004; H01G 9/0029; H01G 9/0032
USPC ................. 361/523, 524, 528, 529; 29/25.03
See application file for complete search history.

(56) References Cited

U.S. PATENT DOCUMENTS

| | | | |
|---|---|---|---|
| 5,790,368 A | 8/1998 | Naito et al. | |
| 2009/0208640 A1* | 8/2009 | Song ..................... | H01G 4/33 427/126.3 |

FOREIGN PATENT DOCUMENTS

| | | |
|---|---|---|
| JP | 63-126211 A | 5/1988 |
| JP | 03-254108 A | 11/1991 |
| JP | 9-17686 A | 1/1997 |
| JP | 9-17685 A | 7/1997 |
| JP | 2000-068160 A | 3/2000 |
| JP | 2008-205112 A | 9/2008 |

OTHER PUBLICATIONS

International Search Report in PCT/JP2012/055907 dated May 15, 2012 with English Translation.

* cited by examiner

*Primary Examiner* — Eric Thomas
*Assistant Examiner* — Arun Ramaswamy
(74) *Attorney, Agent, or Firm* — McDermott Will & Emery LLP (57) ABSTRACT

To provide a solid electrolytic capacitor capable of high performance, the capacitor including: an anode element made of tantalum or niobium; a dielectric film disposed on the anode element; and a solid electrolytic layer disposed on the dielectric film, the dielectric film including: a first dielectric film made of an oxide of the tantalum or niobium, formed on a surface of the anode element; and a second dielectric film made of a composite metal oxide having a perovskite structure, formed on the first dielectric film.

17 Claims, 7 Drawing Sheets

SOLID ELECTROLYTIC CAPACITOR AND METHOD OF PRODUCING SAME

RELATED APPLICATIONS

This application is the U.S. National Phase under 35 U.S.C. §371 of International Application No. PCT/JP2012/055907, filed Mar. 8, 2012, which in turn claims the benefit of Japanese Application No. 2011-056500, filed on Mar. 15, 2011, the disclosures of which Applications are incorporated by reference herein.

TECHNICAL FIELD

The present invention relates to a solid electrolytic capacitor and a method for producing the same.

BACKGROUND ART

Conventionally, various capacitors have been developed in an attempt to reduce size and increase capacity. Among them, solid electrolytic capacitors are widely known as capacitors fit for size reduction. A solid electrolytic capacitor comprises an anode element, a dielectric film disposed on the anode element, and a solid electrolytic layer disposed on the dielectric film; and has an excellent feature of having a large capacity despite its small size.

Widely used as an electrolyte for the solid electrolytic layer, are a manganese oxide, a conductive polymer, etc.; and as a material for the anode element, a valve metal, examples thereof including tantalum, niobium, aluminum, and titanium. By using a valve metal as the material for the anode element, a uniform dielectric film can be formed on the surface of the anode element, by chemical conversion treatment.

Further improvements are being made on the foregoing solid electrolytic capacitor. For example, development efforts are underway for a technique to reduce particle size of particles of the metal used for the anode element which is a sintered element. By reducing the particle size of the metal particles, surface area of the anode element can be further increased, and therefore, surface area of the dielectric film can be further increased; and it is presumed that the foregoing enables larger capacity of the solid electrolytic capacitor.

For example, Patent Literatures 1 and 2 disclose a solid electrolytic capacitor having a small size and a large capacity, the capacitor comprising: an anode element which is a sintered element of titanium; and a dielectric film made of barium titanate ($BaTiO_3$). A composite metal oxide having a perovskite structure, e.g., barium titanate, has a dielectric constant ten times or higher than that of an oxide formed by chemical conversion treatment; and it is presumed that using such a composite metal oxide enables larger capacity of the solid electrolytic capacitor.

CITATION LIST

Patent Literatures

[Patent Literature 1] Japan Laid-Open Patent Publication No. Hei 3-254108
[Patent Literature 2] Japan Laid-Open Patent Publication No. Hei 9-17686

SUMMARY OF INVENTION

Technical Problem

However, for example, in the anode element which is a sintered element, the reduced particle size of the metal particles causes a joint between the metal particles to become thin, thus causing a problem of difficulty in adjusting the voltage applied during chemical conversion treatment. Such thinning of the joint leads to a problem of increase in leakage current; and furthermore, of difficulty in deriving capacity, caused by loss of the joint due to chemical conversion treatment.

In the techniques disclosed in Patent Literatures 1 and 2, the dielectric film made of barium titanate is formed on a surface of the sintered element of titanium. However, there is a problem, because it is actually difficult to form a sintered element using titanium. Furthermore, the present inventors found that leakage current in the solid electrolytic capacitor having the dielectric film made of barium titanate, was very large; and thus, breakdown voltage in the solid electrolytic capacitor, was low. Therefore, by the techniques disclosed in Patent Literatures 1 and 2, it is difficult to actually provide a solid electrolytic capacitor capable of high performance.

Thus, in view of the reasons as above, an object of the present invention is to provide a solid electrolytic capacitor capable of high performance and a method for producing the same.

Solution to Problem

A first embodiment of the present invention is a solid electrolytic capacitor comprising: an anode element comprising tantalum or niobium; a dielectric film disposed on the anode element; and a solid electrolytic layer disposed on a surface of the dielectric film, the dielectric film comprising: a first dielectric film comprising an oxide of the tantalum or niobium formed on a surface of the anode element; and a second dielectric film comprising a composite metal oxide having a perovskite structure formed on the first dielectric film.

In the foregoing solid electrolytic capacitor, the composite metal oxide having a perovskite structure is preferably barium titanate.

In the foregoing solid electrolytic capacitor, the second dielectric film is preferably partially formed on the first dielectric film; and the solid electrolytic layer is preferably formed, such that the layer is in contact with each of the following: the first dielectric film not covered with the second dielectric film; and the second dielectric film.

A second embodiment of the present invention is a method for producing a solid electrolytic capacitor, the method comprising the steps of: making an anode element comprising a first metal; forming, on a surface of the anode element, at least one of a metal film comprising a second metal different from the first metal, and a metal oxide film comprising an oxide of the second metal; subjecting the anode element to chemical conversion treatment so that the first metal of the surface part of the anode element converts to an oxide, thereby to form a first dielectric film comprising the oxide of the first metal; subjecting the anode element to hydrothermal reaction so that the metal film or the metal oxide film converts to a composite metal oxide, thereby to form a second dielectric film comprising the composite metal oxide containing the second metal; and forming a solid electrolytic layer on the dielectric film comprising the first and second dielectric films.

A third embodiment of the present invention is a method for producing a solid electrolytic capacitor, the method comprising the steps of: forming, on a surface of particles of a powder of a first metal, at least one of a metal film comprising a second metal different from the first metal, and a metal oxide film comprising an oxide of the second metal; sintering the powder of the first metal having the metal film or the metal oxide film, thereby to make an anode element having thereon the metal film or the metal oxide film; subjecting the anode element to chemical conversion treatment so that the first metal of a surface part of the anode element converts to an oxide, thereby to form a first dielectric film comprising the oxide of the first metal; subjecting the anode element to hydrothermal reaction so that the metal film or the metal oxide film converts to a composite metal oxide, thereby to form a second dielectric film comprising the composite metal oxide containing the second metal; and forming a solid electrolytic layer on the dielectric film comprising the first and second dielectric films.

In the foregoing method for producing the solid electrolytic capacitor, the first metal is preferably tantalum or niobium, and the second metal is preferably titanium.

In the foregoing method for producing the solid electrolytic capacitor, the composite metal oxide preferably has a perovskite structure.

In the foregoing method for producing the solid electrolytic capacitor, the composite metal oxide is preferably barium titanate.

In the foregoing method for producing the solid electrolytic capacitor, the metal film or the metal oxide film is preferably formed such that the film partially covers the surface of the anode element.

In the foregoing method for producing the solid electrolytic capacitor, the anode element is preferably subjected to chemical conversion treatment after having undergone hydrothermal reaction.

Advantageous Effect of Invention

According to the present invention, it is possible to provide a solid electrolytic capacitor capable of high performance and a method for producing the same.

BRIEF DESCRIPTION OF DRAWINGS

FIGS. 4(A) to 4(E) are schematic vertical sectional views of the solid electrolytic capacitor undergoing production, to graphically explain an example of the method for producing the solid electrolytic capacitor according to the present invention.

DESCRIPTION OF EMBODIMENTS

In the following, a description will be given on embodiments of a solid electrolytic capacitor according to the present invention, with reference to drawings. The following embodiments are merely examples, and various embodiments are possible within the scope of the present invention. In the drawings of the present invention, like reference numerals shall denote like parts or corresponding parts.

[First Embodiment: Solid Electrolytic Capacitor]

Figure 1:
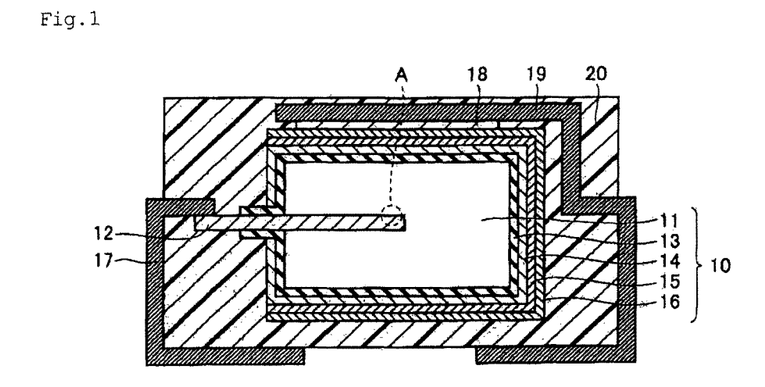
FIG. 1 is a schematic vertical sectional view of an example of a solid electrolytic capacitor according to a first embodiment.
Figure 2:
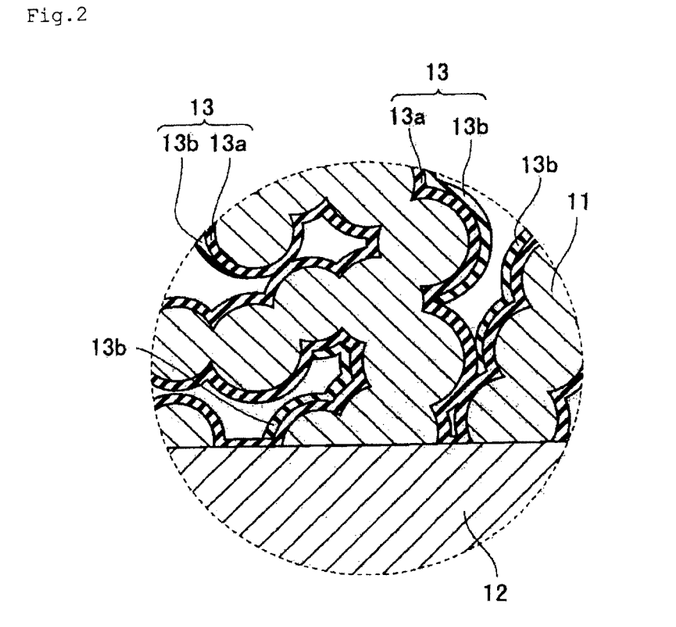
FIG. 2 is an enlarged schematic view of an area A illustrated in FIG. 1.

In the following, a description will be given on an embodiment of a solid electrolytic capacitor according to the present invention, using FIGS. 1 and 2. FIG. 1 is a schematic vertical sectional view of an example of the solid electrolytic capacitor in a first embodiment. FIG. 2 is an enlarged schematic view of an area A illustrated in FIG. 1.

In FIG. 1, the solid electrolytic capacitor comprises: an anode element 11 to which an anode lead 12 is embedded in a standing position; a dielectric film 13 disposed on a surface of the anode element 11; and a solid electrolytic layer 14 disposed on the dielectric film 13. Moreover, a cathode layer comprising a carbon layer 15 and a silver paint layer 16 stacked in this order, is disposed on the solid electrolytic layer 14. Thus, the anode element 11, the anode lead 12, the dielectric film 13, the solid electrolytic layer 14, the carbon layer 15, and the silver paint layer 16 constitute a capacitor element 10.

An anode terminal 17 is connected to the anode lead 12; and a cathode terminal 19 is connected to the silver paint layer 16, with an adhesion layer 18 composed of a conductive adhesive interposed between the terminal 19 and the layer 16. Furthermore, the capacitor element 10 is encapsulated with a sheathing resin 20, such that a part of the anode terminal 17 and a part of the cathode terminal 19 are exposed. In FIG. 1, the exposed parts of the anode terminal 17 and cathode terminal 19 are bent along a surface of the sheathing resin 20.

The anode element 11 is a sintered element of tantalum or niobium, tantalum being more preferable in terms of low leakage current. In FIG. 1, the anode element 11 is shown in block form for convenience of illustration. More specifically, as illustrated in FIG. 2, the anode element 11 has a porous structure in which particles of the metal of the anode element 11 are irregularly bound to one another. Material of the anode lead 12, one end of which is embedded in the anode element 11, is not particularly limited as long as it is a metal; however, the material is preferably a metal same as that used for the anode element 11.

As illustrated in FIG. 2, the dielectric film 13 comprises a first dielectric film 13a formed on the surface of the anode element 11 and a second dielectric film 13b formed on the first dielectric film 13a. The dielectric film 13 covers the particles of the metal of the anode element 11.

The first dielectric film 13a is an oxide film made of an oxide of the metal of the anode element 11. The composition of the oxide film is expressed by a chemical formula $Ta_2O_5$ when the metal is tantalum; and by a chemical formula $Nb_2O_5$ when the metal is niobium. The first dielectric film 13a, i.e., the oxide film, is produced by oxidation of the metal of the surface part of the anode element 11, by chemical conversion treatment. The dielectric film is also formed on a surface of the anode lead 12, by chemical conversion treatment. If the anode lead 12 is of the same metal as the anode element 11, the first dielectric film 13a would also be present on the surface of the anode lead 12, as illustrated in FIG. 2.

The second dielectric film 13b is a composite metal oxide film made of a composite metal oxide having a perovskite structure, examples thereof including barium titanate (BaTiO$_3$), calcium titanate (CaTiO$_3$), and strontium titanate (SrTiO$_3$). Among these examples, barium titanate is easily produced from titanium and has a higher dielectric constant compared to the other composite metal oxides having a perovskite structure; and thus can be suitably used as the second dielectric film 13b.

The second dielectric film 13b made of the composite metal oxide having a perovskite structure has a dielectric constant ten times or higher than that of the first dielectric film 13a, i.e., the oxide film made of tantalum or niobium. Therefore, in the present embodiment, the dielectric film 13 can have a higher dielectric constant than a conventional dielectric film made of only an oxide film. Moreover, according to the present embodiment, it is possible to suppress increase in leakage current in the solid electrolytic capacitor, caused due to the capacitor having the dielectric film made of barium titanate. Although the reason for this is not clear, the following is presumable as one reason.

Typically, crystallinity of a composite metal oxide having a perovskite structure tends to be higher than that of an oxide of a valve metal. Therefore, cracks easily occur in a dielectric film made of a composite metal oxide having a perovskite structure. Thus, it is presumed that increase in leakage current is due to the cracks reaching an interface between an anode element and the dielectric film. It is also presumed that leakage current occurs from a grain boundary. In contrast, according to the present embodiment, the first dielectric film 13a that is amorphous and capable of having a denser structure than the second dielectric film 13b, is present between the second dielectric film 13b and the anode element 11. By such a constitution, growth of cracks that occurs in the second dielectric film 13b is suppressed in the vicinity of an interface between the second dielectric film 13b and the first dielectric film 13a; and therefore, the cracks can be prevented from reaching the surface of the anode element 11. Therefore, according to the present embodiment, it is possible to suppress increase in leakage current in the solid electrolytic capacitor.

The second dielectric film 13b may be partially formed on the first dielectric film 13a, as illustrated in FIG. 2. In this case, the solid electrolytic layer 14 would be formed such that the layer is in contact with each of the following: the first dielectric film 13a not covered with the second dielectric film 13b; and the second dielectric film 13b. By the second dielectric film 13b being partially formed on the first dielectric film 13a, it is possible to suppress increase in leakage current in the solid electrolytic capacitor, much more effectively. Although the reason for this is not clear, the reason already given in the foregoing is presumable. Moreover, it is presumed that properties of materials of the composite metal oxide cause increase in leakage current in the solid electrolytic capacitor.

Returning to FIG. 1, the solid electrolytic layer 14 is disposed on the dielectric film 13, and in view of FIG. 2, also on interstices on the surface of the anode element 11. Material for the solid electrolytic layer 14 is not particularly limited, and can be manganese dioxide, a TCNQ complex salt (7,7,8,8-tetracyanoquinodimethane), a conductive polymer, or the like. The conductive polymer is a polymer which includes at least one of an aliphatic compound, an aromatic compound, a heterocyclic compound, and a heteroatom-containing compound, examples of such polymer including polythiophene and derivatives thereof, polypyrrole and derivatives thereof, polyaniline and derivatives thereof, and polyfuran and derivatives thereof.

The carbon layer 15 can be of any material as long as it has conductivity, and can be of, for example, graphite. The silver paint layer 16 can be composed of silver particles. The anode terminal 17 and the cathode terminal 19 can be of any material as long as they have conductivity, and can be of, for example, metal such as copper. The adhesion layer 18 can be of any material as long as it has conductivity and adhesiveness, and can be of, for example, a silver adhesive containing silver as fillers. Material for the sheathing resin 20 is not particularly limited, and can be, for example, a known resin such as epoxy resin.

In the solid electrolytic capacitor in the present embodiment, the dielectric film 13 comprising the first dielectric film 13a and the second dielectric film 13b is able to have a higher dielectric constant than a conventional dielectric film. Therefore, the solid electrolytic capacitor in the present embodiment is able to have a higher capacitance than in the past. Moreover, as described above, according to the solid electrolytic capacitor in the present embodiment, increase in leakage current is more suppressed, compared to the case where a dielectric film is made only from a composite metal oxide having a perovskite structure, and therefore, it is possible to provide a solid electrolytic capacitor capable of high performance.

Taking into account that a sintered element of titanium has poor uniformity, titanium is not used for the anode element 11. Instead, tantalum or niobium is used, and thus, uniformity of the anode element can be improved. A sintered element of tantalum particularly has resistance against hydrothermal reaction that is performed to form the second dielectric film 13b. Therefore, the solid electrolytic capacitor having the anode element composed of tantalum can, for example, have improved voltage resistance, because the anode element is prevented from deterioration due to corrosion and other factors. By using tantalum, leakage current in the solid electrolytic capacitor can be suppressed much more effectively.

In the present embodiment, titanium oxide (e.g., TiO, TiO$_2$) may be included in the dielectric film 13. In the solid electrolytic capacitor in the present embodiment, due to how the dielectric film 13 is produced, titanium oxide resulting from hydrothermal reaction or chemical conversion treatment may remain in the second dielectric film 13b. Nevertheless, the solid electrolytic capacitor can still achieve the effect described above.

The solid electrolytic capacitor according to the present invention is not limited to that having the anode element which is a sintered element described as above. For example, the solid electrolytic capacitor may be a wound-type, including a metal foil made of tantalum or niobium as the anode element; or a single layer-type or stack-type, including a rectangular metal foil or a metal plate made of tantalum or niobium.

[Second Embodiment: Method for Producing Solid Electrolytic Capacitor]

Figure 3:
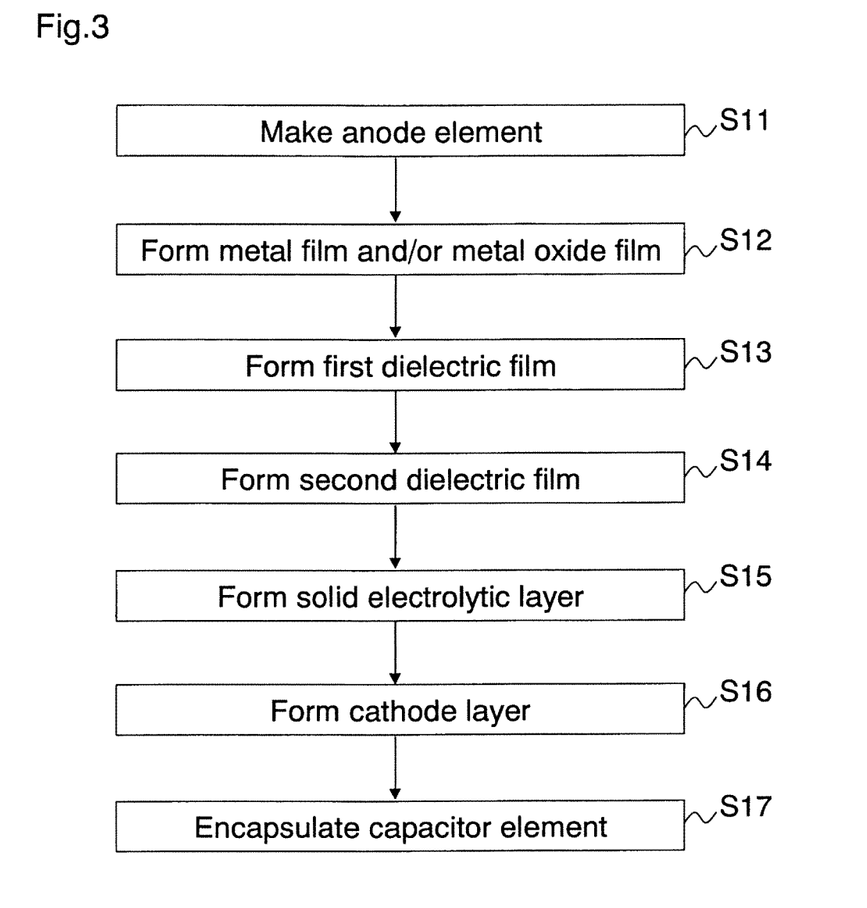
FIG. 3 is a flowchart for an example of a method for producing the solid electrolytic capacitor, according to a second embodiment.
Figure 4:
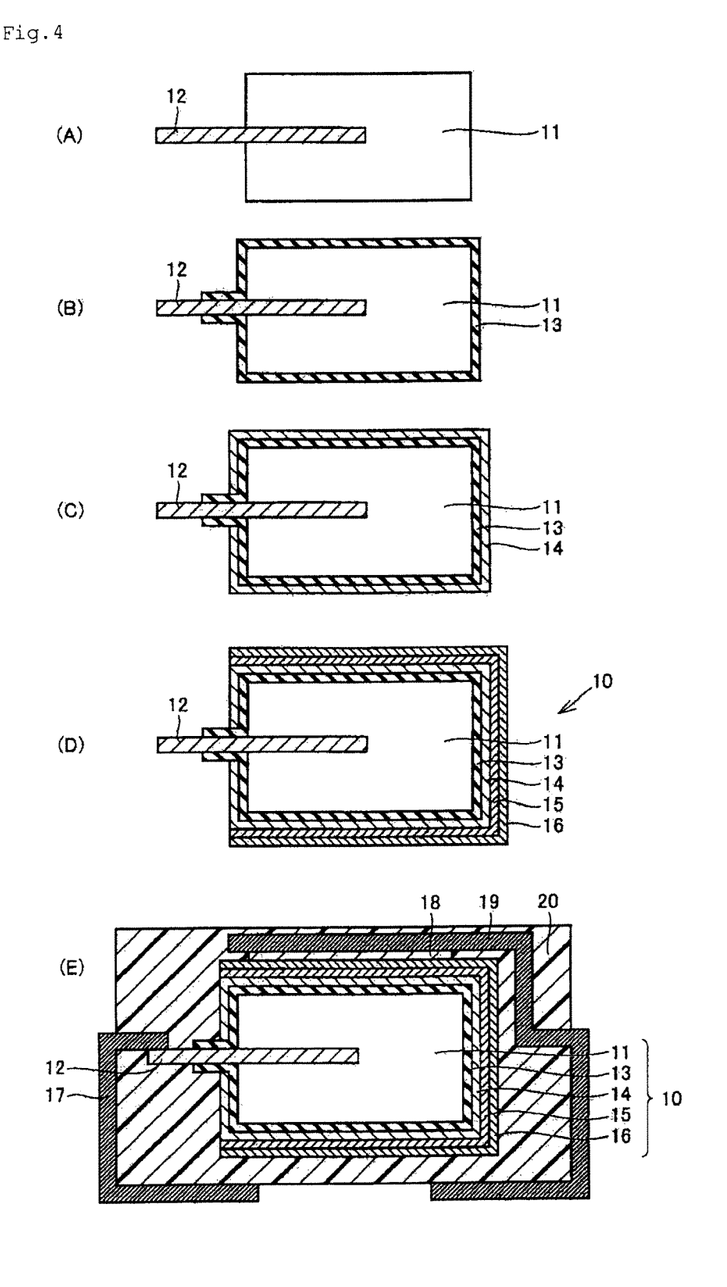

In the following, by using FIGS. 2 to 4, a description will be given on a second embodiment which is an example of a method for producing the solid electrolytic capacitor of the present invention. FIG. 3 is a flowchart for an example of the method for producing the solid electrolytic capacitor, according to the second embodiment. FIGS. 4(A) to 4(E) are schematic vertical sectional views of the solid electrolytic capacitor undergoing production, to graphically explain an example of the method for producing the solid electrolytic capacitor according to the present invention. The constitution of the solid electrolytic capacitor produced in the present embodiment is the same as that of the solid electrolytic capacitor according to the first embodiment.

(Step of Forming Anode Element)

First, in a step S11 in FIG. 3, an anode element 11 is made as illustrated in FIG. 4(A). For example, a powder of a first metal is prepared; and then, the powder of the first metal is molded into a body having a desired shape. In the molded body, one longitudinal end portion of an anode lead 12 in rod form, is embedded. Next, the molded body is sintered to make an anode element 11 having a porous structure.

The first metal is any one of tantalum, niobium, and aluminum. Among the foregoing, preferred are tantalum and niobium, due to their high resistance to hydrothermal reaction that will be described later and their better ability, compared to aluminum, to prevent corrosion, dissolution, and other kinds of deterioration by hydrothermal reaction. Further preferred is tantalum, additionally due to its ability to enable smaller leakage current in the solid electrolytic capacitor that is to be produced. Material for the anode lead 12 is not particularly limited. However, taking into account the process of producing the anode lead 12, the material is preferably a metal same as that for the anode element 11.

(Step of Forming Metal Film and/or Metal Oxide Film)

Next, in a step S12 in FIG. 3, at least one of the following is formed on a surface of the anode element 11: a metal film made of a second metal different from the first metal; and a metal oxide film made of an oxide of the second metal. The metal film can be formed by attaching particles of the second metal to the surface of the anode element 11, by a gas phase method such as vapor deposition or sputtering. The metal oxide film can be formed by attaching particles of an oxide of the second metal to the surface of the anode element 11, by the foregoing gas phase method, or a liquid phase method such as electrodeposition or sol-gel process. By forming the metal film or the metal oxide film by such methods, the film can be formed on the surface of the anode element 11, more uniformly and with higher adhesion.

The metal film and the metal oxide film convert to a second dielectric film 13b by hydrothermal reaction that will be described later. The second dielectric film 13b is preferably made of a composite metal oxide having a perovskite structure; and from the fact that such a composite metal oxide has a higher dielectric constant when it contains titanium, the second metal is preferably titanium. The metal film and the metal oxide film may entirely or partially cover a surface of particles of the first metal of the anode element 11.

(Step of Forming First Dielectric Film)

Next, in a step S13 in FIG. 3, a first dielectric film 13a is formed on the surface of the anode element 11 (c.f., FIG. 2). The first dielectric film 13a can be formed by chemically converting the surface of the anode element 11 on which the metal film or the metal oxide film has been formed.

Specifically, the anode element 11 is immersed in a solution for chemical conversion treatment, such as an aqueous solution of ammonium adipate or phosphoric acid of 0.01 percent by weight or more and 2 percent by weight or less; and then, voltage is applied to the anode element 11 under a normal pressure for a predetermined time. Thus, the first metal of the surface part of the anode element 11 converts to an oxide; and a first dielectric film 13a made of the oxide of the first metal is formed. For example, when the metal for the anode element 11 is Ta, Nb, or Al, the first dielectric film is $Ta_2O_5$, $Nb_2O_5$, or $Al_2O_3$.

(Step of Forming Second Dielectric Film)

Next, in a step S14 in FIG. 3, the second dielectric film 13b comprising the composite metal oxide including the second metal, is formed on the anode element 11 (c.f., FIG. 2). The second dielectric film 13b can be formed by allowing hydrothermal reaction to proceed on the surface of the anode element 11 on which the metal film or the metal oxide film has been formed.

Specifically, the anode element 11, the surface of which has the metal film or the metal oxide film formed thereon, is immersed in a solution for hydrothermal reaction; and is then heated in a highly pressured environment for a predetermined time. Thus, the metal film or the metal oxide film converts to a composite metal oxide, and a second dielectric film 13b comprising the composite metal oxide is formed. The metal film and the metal oxide film may be oxidized due to the foregoing chemical conversion treatment. Nevertheless, even in such an oxidized state, the metal film and the metal oxide film can convert to a composite metal oxide by hydrothermal reaction.

The second dielectric film 13b comprising the composite metal oxide has a higher dielectric constant than the first dielectric film 13a. Therefore, by producing the solid electrolytic capacitor having not only the first dielectric film 13a but also the second dielectric film 13b, it is possible to produce a solid electrolytic capacitor having a larger capacitance than a conventional solid electrolytic capacitor.

In particular, the second dielectric film 13b preferably includes a composite metal oxide having a perovskite structure. A composite metal oxide having a perovskite structure which includes titanium particularly has a dielectric constant ten times or higher than that of an oxide formed by typical chemical conversion treatment; and therefore, it is possible to produce a solid electrolytic capacitor having a capacitance that is particularly high.

Examples of a composite metal oxide having a perovskite structure including titanium, include barium titanate ($BaTiO_3$), calcium titanate ($CaTiO_3$), and strontium titanate ($SrTiO_3$). Among these, barium titanate is easily produced from titanium and has a higher dielectric constant compared to the other composite metal oxides having a perovskite structure; and therefore, can be suitably used as the second dielectric film 13b. Barium titanate can be formed, for example, by immersing the anode element 11, having on its surface the metal film made of titanium or the metal oxide film made of an oxide of titanium, into an aqueous solution containing $Ba(OH)_2$, $Ba(NO_3)_2$, or the like; and then heating the aqueous solution at 120° C. or higher and 200° C. or lower, in an environment of 2 atmospheres or higher and 15 atmospheres or lower. By the foregoing process, a dielectric film is produced on the anode element 11, as illustrated in FIG. 4(B).

(Step of Forming Solid Electrolytic Layer)

Next, in a step 15 in FIG. 3, a solid electrolytic layer 14 is formed on the dielectric film 13, as illustrated in FIG. 4(C). The solid electrolytic layer 14 is not particularly limited, and any known solid electrolyte can be used. In particular, a conductive polymeric layer is preferably used, in terms of high conductivity. In the following, a description will be given on an example of a method for forming the solid electrolytic layer 14 comprising polythiophene, by chemical polymerization.

For Example, first, the anode element 11, on which the dielectric film 13 has been formed, is immersed in a liquid for polymerization containing an oxidant, a dopant, and 3,4-ethylenedioxythiophene, i.e., a precursor of polythiophene. This enables the liquid to enter interstices of the anode element 11. Next, the anode element 11 is taken out of the liquid, and the 3,4-ethylenedioxythiophene is chemically polymerized on the dielectric film 13. By the foregoing, a solid electrolytic layer 14 comprising polythiophene is formed on the dielectric film 13. The method for forming the solid electrolytic layer 14 is not limited to the above, and any known method can be used.

(Step of Forming Cathode Layer)

Next, in a step S16 in FIG. 3, a cathode layer comprising a carbon layer 15 and a silver paint layer 16 is formed on the solid electrolytic layer 14, as illustrated in FIG. 4(D). Methods for forming the carbon layer 15 and the silver paint layer 16, are not particularly limited.

For example, the carbon layer 15 can be formed by immersing the anode element 11, on which the solid electrolytic layer 14 has been formed, into a solution in which carbon particles are dispersed; and then drying the resultant. The silver paint layer 16 can be formed, for example, by immersing the anode element 11, after the carbon layer 15 has been formed thereon, into a solution containing silver particles; and then drying the resultant. By the foregoing process, a capacitor element 10 is produced.

(Step for Encapsulating Capacitor Element)

Next, in a step S17 in FIG. 3, the capacitor element 10 is encapsulated to produce a solid electrolytic capacitor, as illustrated in FIG. 4(E). A method for the encapsulation is not particularly limited. For example, there is the following method.

First, an anode terminal 17 is connected to one exposed end of an anode lead 12; and an adhesion layer 18 is formed on the silver paint layer 16, and one end of a cathode terminal 19 is connected to the adhesion layer 18. Next, the capacitor element 10 is encapsulated with a sheathing resin 20, such that the other ends of the anode terminal 17 and cathode terminal 19 are exposed. Finally, the exposed portions of the anode terminal 17 and cathode terminal 19 are bent along the sheathing resin 20, and the resultant is aged, to produce a solid electrolytic capacitor as illustrated in FIG. 4(E).

According to the foregoing method for producing the solid electrolytic capacitor in the present embodiment, it is possible to produce a solid electrolytic capacitor having the dielectric film 13 comprising the first dielectric film 13a and the second dielectric film 13b. The second dielectric film 13b is made of the composite metal oxide including the second metal different from the first metal of the anode element 11; and has a higher dielectric constant than the first dielectric film 13a. Thus, according to the method for producing the solid electrolytic capacitor provided by the present embodiment, it is possible to produce a solid electrolytic capacitor having a higher capacitance than a conventional solid electrolytic capacitor.

The second dielectric film 13b may be formed such that the film partially covers the first dielectric film 13a (c.f., FIG. 2). Such formation of the second dielectric film 13b is preferable in terms of easiness. Partial formation of the second dielectric film on the first dielectric film 13a enables a much more effective reduction of leakage current.

In the present embodiment, the method given for hydrothermal reaction, is for the case of forming $BaTiO_3$. For example, in the case of forming $CaTiO_3$, an aqueous solution containing $Ca(OH)_2$, $Ca(NO_3)_2$, or the like can be used; and in the case of forming $SrTiO_3$, an aqueous solution containing $Sr(OH)_2$, $Sr(NO_3)_2$, or the like can be used.

[Third Embodiment: Method for Producing Solid Electrolytic Capacitor]

Figure 5:
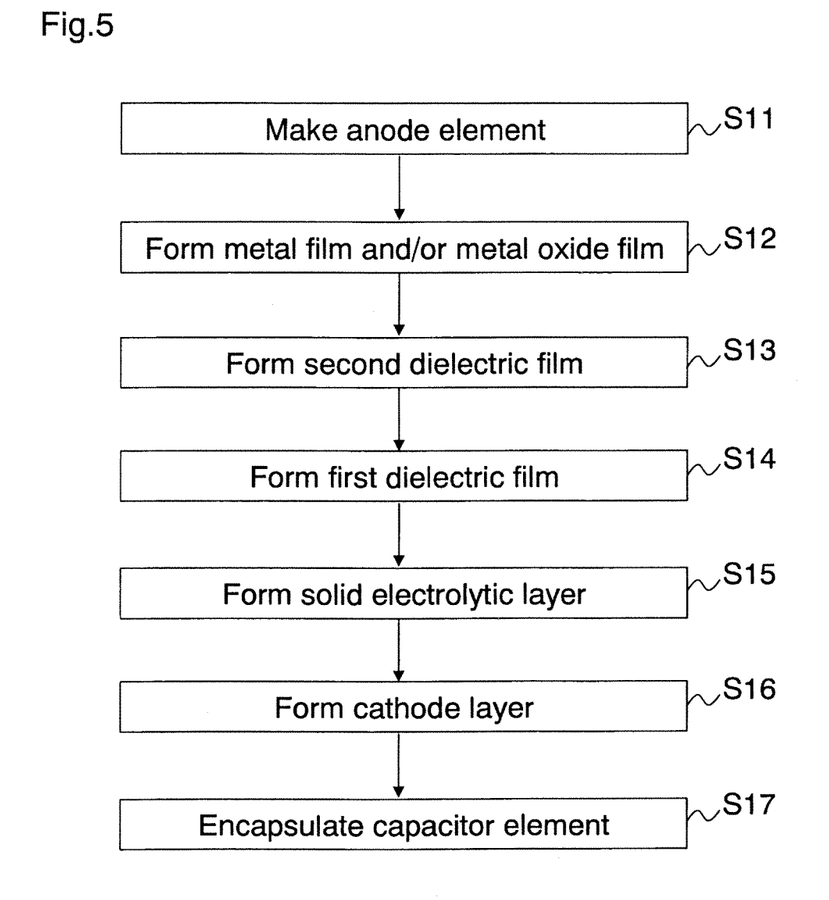
FIG. 5 is a flowchart for an example of the method for producing the solid electrolytic capacitor, according to a third embodiment.

FIG. 5 is a flowchart for an example of the method for producing the solid electrolytic capacitor, according to a third embodiment. The method for producing the solid electrolytic capacitor according to the present embodiment differs from the second embodiment, in that the step of forming the first dielectric film 13a comes after the step of forming the second dielectric film 13b. Other than the foregoing, the steps are the same as in the second embodiment. Since details of the steps are the same as for the second embodiment, they will not be repeated here.

According to the method for producing the solid electrolytic capacitor provided by the present embodiment, it is possible to produce a solid electrolytic capacitor having the dielectric film 13 comprising the first dielectric film 13a and the second dielectric electrolytic film 13b. Thus, according to the method for producing the solid electrolytic capacitor provided by the present embodiment, it is possible to produce a solid electrolytic capacitor having a higher capacitance than a conventional solid electrolytic capacitor.

According to the present embodiment, the metal film or metal oxide film including the second metal that has been formed on the surface of the anode element 11, is converted to a composite metal oxide including the second metal, by hydrothermal reaction, to form a second dielectric film 13b (step S14); and thereafter, the first metal of the surface part of the anode element 11 is converted to an oxide of the first metal, by chemical conversion treatment, to form a first dielectric film 13a (step S13). By chemically converting the surface of the anode element 11 on which the second dielectric film 13b has been formed, it is possible to oxidize the first metal of the surface part of the anode element 11, and to thus form the first dielectric film 13a as in the second embodiment; and furthermore, to more selectively oxidize the first metal at parts where leakage currents tend to occur. Thus, according to the present embodiment, it is possible to much more effectively suppress leakage currents; and also, to oxidize the metal film that did not convert to a composite metal oxide, by chemical conversion treatment. Thus, the dielectric constant of the dielectric film 13 can be made higher, and a solid electrolytic capacitor with a higher capacitance can be produced.

[Fourth Embodiment: Method for Producing Solid Electrolytic Capacitor]

Figure 6:
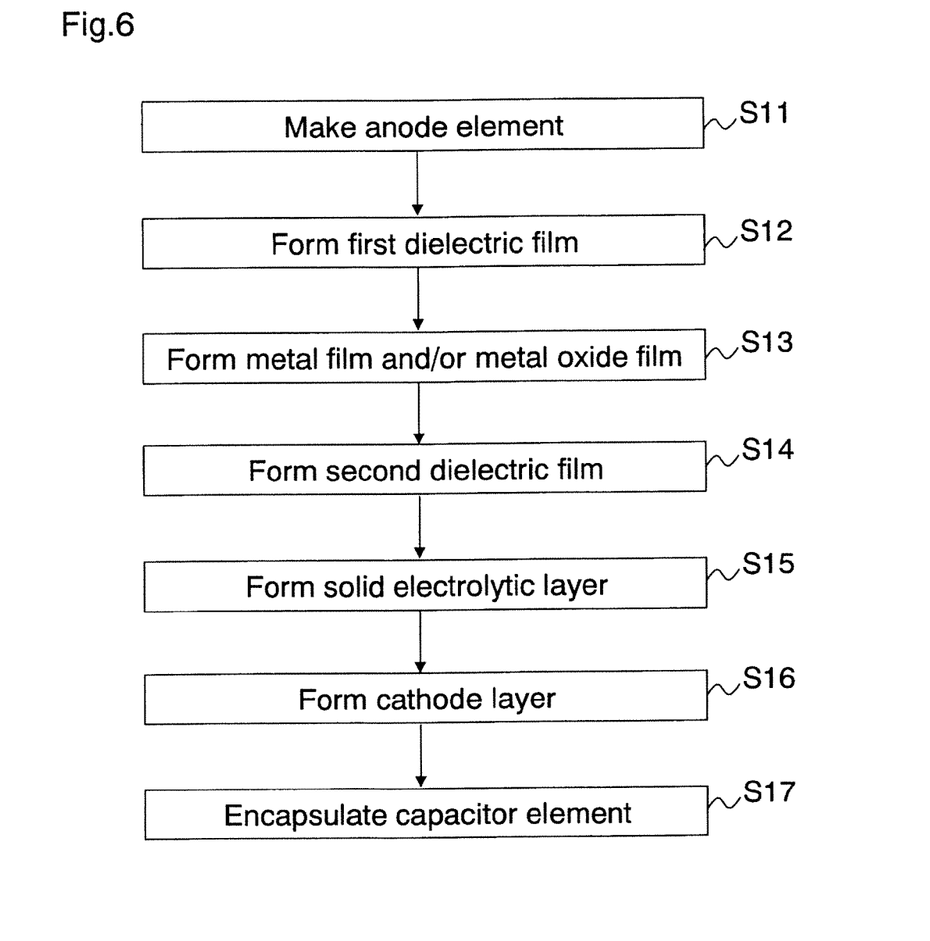
FIG. 6 is a flowchart for an example of the method for producing the solid electrolytic capacitor, according to a fourth embodiment.

FIG. 6 is a flowchart for an example of the method for producing the solid electrolytic capacitor, according to a fourth embodiment. The method for producing the solid electrolytic capacitor according to the present embodiment differs from the second embodiment, in that the step of forming the metal film and/or the metal oxide film comes after the step of forming the first dielectric film 13a. Other than the foregoing, the steps are the same as in the second embodiment. Since details of the steps are the same as for the second embodiment, they will not be repeated here.

According to the present embodiment, it is possible to produce a solid electrolytic capacitor having the dielectric film 13 comprising the first dielectric film 13a and the second dielectric film 13b. Thus, according to the method for producing the solid electrolytic capacitor provided by the present embodiment, it is possible to produce a solid electrolytic capacitor having a higher capacitance than a conventional solid electrolytic capacitor.

According to the method for producing the solid electrolytic capacitor provided by the present embodiment, the first metal of the surface part of the anode element 11, i.e., a sintered element, converts to an oxide to form a first dielectric film 13a comprising the oxide of the first metal (step S13); and thereafter, a metal film and/or a metal oxide film is formed on the surface of the first dielectric film 13a (step S12). That is, when the first dielectric film 13a is formed, the surface of the particles of the anode element 11 is not covered with the film(s) and is exposed; and therefore, the first dielectric film 13a can be formed more uniformly.

[Fifth Embodiment: Method for Producing Solid Electrolytic Capacitor]

Figure 7:
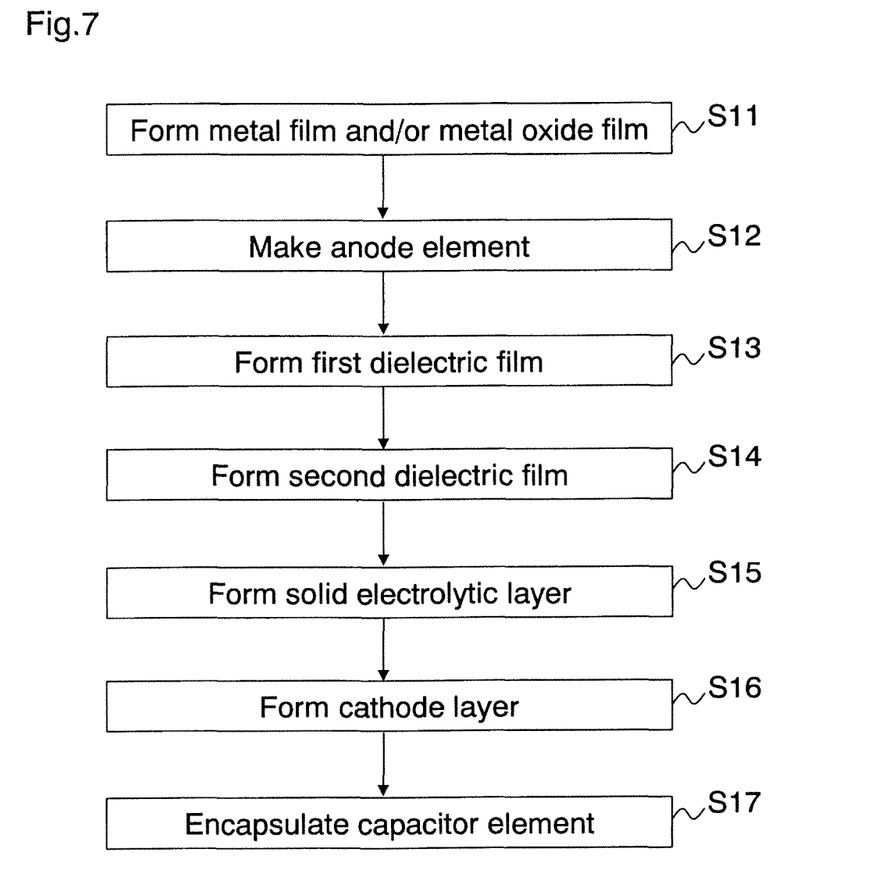
FIG. 7 is a flowchart for an example of the method for producing the solid electrolytic capacitor, according to a fifth embodiment.

FIG. 7 is a flowchart for an example of the method for producing the solid electrolytic capacitor, according to a fifth embodiment. The method for producing the solid electrolytic capacitor according to the present embodiment differs from the second embodiment, in that the step of making the anode element (step S22) comes after the step of forming the metal film and/or the metal oxide film (step S21). Other than the foregoing, the steps are the same as in the second embodiment. In the following, a description will be given on the steps which differ from those in the second embodiment.

(Step of Forming Metal Film and/or Metal Oxide Film)

First, in a step S21 in FIG. 7, at least one of the following is formed on the surface of the particles of the first metal: a metal film made of a second metal differing from the first metal; and a metal oxide film made of an oxide of the second metal. The metal film can be formed, for example, by attaching particles of the second metal to the surface of the particles of the first metal. The metal oxide film can be formed, for example, by attaching particles of the oxide of the second metal to the surface of the particles of the first metal. Specific methods for forming the films are the same as the gas phase method and the liquid phase method described in the foregoing, and therefore will not be repeated here.

Next, in a step S22 in FIG. 7, the particles of the first metal, on which the metal film and/or metal oxide film made of the second metal have been formed, are sintered to make an anode element 11. Specifically, a powder of the first metal that has been prepared in the step S21 is molded into a body having a desired shape, the powder having one longitudinal end portion of an anode lead 12 in rod form, embedded therein. Next, the molded body is sintered to make an anode element 11 having a porous structure.

According to the present embodiment, it is possible to produce a solid electrolytic capacitor having the dielectric film 13 comprising the first dielectric film 13a and the second dielectric film 13b. Thus, according to the method for producing the solid electrolytic capacitor provided by the present embodiment, it is possible to produce a solid electrolytic capacitor having a higher capacitance than a conventional solid electrolytic capacitor.

Since the anode element 11 after sintering has a porous structure, in the production methods according to the second to fourth embodiments, there are cases where it is easy to form the film(s) on the surface of an outer part of the anode element 11 (i.e., corresponds to particle surface which is exposed to outer side), while it is difficult to uniformly form the film(s) on the surface of an inner part of the anode element 11 (i.e., corresponds to particle surface at inner side). In contrast, in the present embodiment, the metal film and/or the metal oxide film are formed on the surface of the particles of the first metal in the step S21; and thereafter, the anode element 11 is made by sintering. Therefore, it is possible to easily form the film(s) on the surface of the inner part of the anode element 11, also.

As such, according to the present embodiment, the metal film and/or the metal oxide film are formed on the surface of the particles of the first metal in the step S21; and thereafter, the anode element 11 is made by sintering these particles. Therefore, it is possible to more uniformly form the metal film or the metal oxide film, even inside the porous structure. Thus, the second dielectric film 13b can be formed more uniformly and over a wider surface area on the first dielectric film 13a. Thus, a solid electrolytic capacitor having a much higher capacitance can be produced.

[Sixth Embodiment: Method for Producing Solid Electrolytic Capacitor]

Figure 8:
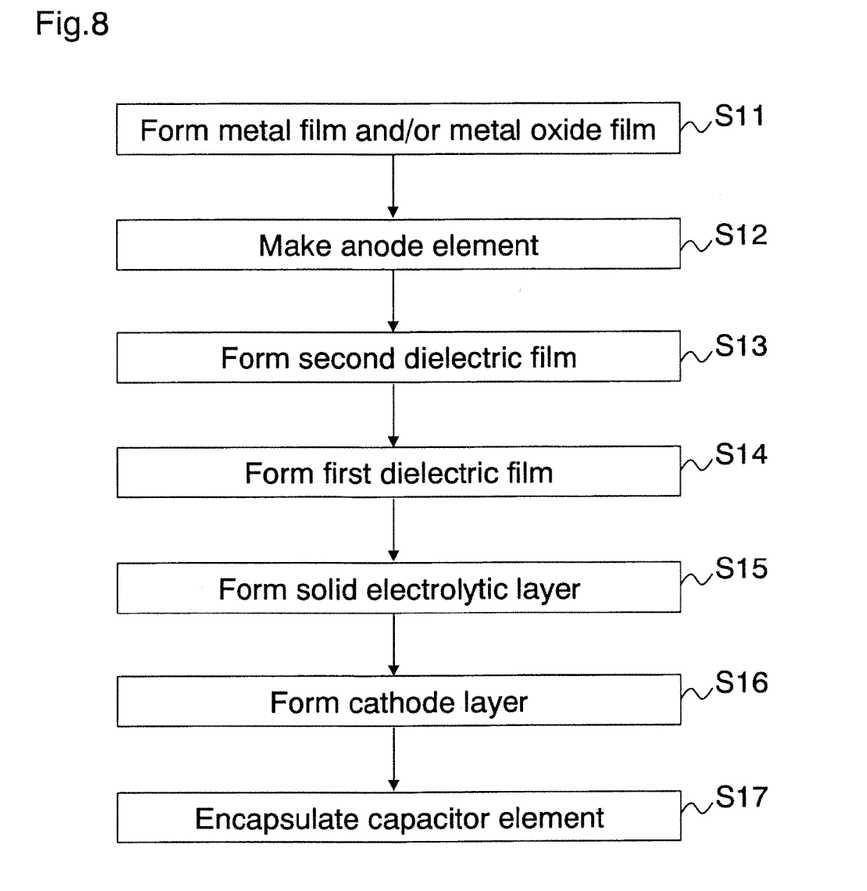
FIG. 8 is a flowchart for an example of the method for producing the solid electrolytic capacitor, according to a sixth embodiment.

FIG. 8 is a flowchart for an example of the method for producing the solid electrolytic capacitor, according to a sixth embodiment. The method for producing the solid electrolytic capacitor according the present embodiment differs from the fifth embodiment, in that the step of forming the first dielectric film 13a comes after the step of forming the second dielectric film 13b. Other than the foregoing, the steps are the same as in the fifth embodiment. Since details of the steps are the same as for the second and fifth embodiments, they will not be repeated here.

According to the present embodiment, it is possible to produce a solid electrolytic capacitor having the dielectric film 13 comprising the first dielectric film 13a and the second dielectric film 13b. Thus, according to the method for producing the solid electrolytic capacitor provided by the present embodiment, it is possible to produce a solid electrolytic capacitor having a higher capacitance than a conventional solid electrolytic capacitor.

Moreover, according to the method for producing the solid electrolytic capacitor provided by the present embodiment, by chemically converting the anode element 11 on which the second dielectric film 13b has been formed, it is possible to oxidize the first metal of the surface part of the anode element 11, and to thus form the first dielectric film 13a; and furthermore, to more selectively oxidize the first metal at parts where leakage currents tend to occur. Thus, according to the present embodiment, it is possible to much more effectively suppress leakage currents; and also, to oxidize the metal film that did not convert to a composite metal oxide, by chemical conversion treatment. Thus, the dielectric constant of the dielectric film 13 can be made much higher.

Moreover, according to the present embodiment, the metal film and/or the metal oxide film are formed on the surface of the particles of the first metal in the step S21; and thereafter, the anode element 11 is made by sintering these particles. Therefore, it is possible to more uniformly form the metal film or the metal oxide film, even inside the porous structure. Thus, the second dielectric film 13b can be formed more uniformly and over a wider surface area on the first dielectric film 13a. Thus, a solid electrolytic capacitor having a much higher capacitance can be produced.

In the foregoing, descriptions were given on the method for producing the solid electrolytic capacitor according to the present invention, as the first to sixth embodiments. However, the method for producing the solid electrolytic capacitor according to the present invention is not limited to production of a solid electrolytic capacitor having an anode element that is a sintered element described as above. For example, production may be for a wound-type solid electrolytic capacitor which includes a metal foil made of tantalum or niobium as an anode element; or a single layer-type or stack-type solid electrolytic capacitor which includes a rectangular metal foil or metal plate made of tantalum or niobium.

EXAMPLES

In the following, the present invention will be described in detail with reference to Examples. However, it should be noted that the present invention is not limited to these Examples.

Example 1

For Example 1, a solid electrolytic capacitor having an anode element, i.e., a sintered element, and a dielectric film as illustrated in FIG. 1 was produced. The dielectric film comprised a first dielectric film made of $Ta_2O_5$ and a second dielectric film made of $BaTiO_3$.

Specifically, first, a tantalum powder having an average primary particle size of 1.5 µm and an average secondary particle size of 50 µm, was prepared. Next, by vapor deposition, titanium was attached to a surface of the tantalum particles prepared, to form a metal film made of titanium on the surface of the tantalum particles. The average film thickness of the metal film was 50 nm. The average particle sizes were measured by using a laser diffraction particle size analyzer, and the average film thickness was measured by using an electron microscope.

Next, the tantalum powder, particles of which had thereon the metal film made of titanium, was molded into a body having a rectangular shape. At that time, the tantalum powder had one longitudinal end portion of an anode lead made of tantalum and in rod form, embedded therein. Then, the molded body produced was sintered to produce an anode element having a porous structure and the one end portion of the anode lead embedded therein. The dimension of the anode element was 4.4 mm in length, 3.2 mm in width, and 1.0 mm in height.

Next, in an environment of 15 atmospheres, the anode element, i.e., a sintered element, was immersed in an aqueous $Ba(OH)_2$ solution of 0.2 N. Then, the aqueous solution was heated at 200° C. for 30 minutes to subject the anode element to hydrothermal reaction. The hydrothermal reaction caused Ti to convert to $BaTiO_3$. Thus, a $BaTiO_3$ film to serve as a second dielectric film was formed.

Next, under a normal pressure, the anode element, having undergone hydrothermal reaction, was immersed in an aqueous phosphoric acid solution of 2 mass %. Then, a voltage of 64 V was applied to the anode element for ten hours, for chemical conversion treatment. The chemical conversion treatment caused tantalum of the surface part of the particles of the tantalum powder, to convert to a tantalum oxide ($Ta_2O_3$). Thus, a $Ta_2O_3$ film to serve as a first dielectric film was formed. By the foregoing process, a dielectric film comprising a $BaTiO_3$ film and a $Ta_2O_3$ film was formed on the anode element.

Next, a solid electrolytic layer was formed on the dielectric film by chemical polymerization. Specifically, first, an aqueous butanol solution containing 3 mol/L of 3,4-ethylenedioxythiophene and 30 mol/L of iron (III) tris-p-toluenesulfonate, was prepared. Then, the anode element having the dielectric film thereon was immersed for five minutes in the aqueous butanol solution adjusted to 25° C. Thereafter, the anode element was taken out of the aqueous butanol solution, and left to dry at room temperature for ten minutes or longer. By the foregoing process, a polythiophene layer to serve as the solid electrolytic layer was formed on the dielectric film.

Next, a suspension of graphite particles was applied onto the polythiophene layer and dried in the air, to form a carbon layer. Furthermore, by using a solution containing silver particles, a silver particle layer was formed on the carbon layer. By the foregoing process, a capacitor element was produced.

Then, for the capacitor element, an anode terminal made of copper was welded to the anode lead; and a silver adhesive was applied to the silver paste layer to form an adhesion layer, and one end of a cathode terminal made of cooper was attached to the adhesion layer. Furthermore, the capacitor element was encapsulated with a sheathing resin, such that the ends of the anode terminal and cathode terminal were exposed. The exposed portions of the anode terminal and cathode terminal were bent along the sheathing resin. The resultant was then aged.

The solid electrolytic capacitor produced had a rated voltage of 16 V; and was 7.3 mm in length, 4.3 mm in width, and 2.0 mm in height. For the present example, 30 pieces of the solid electrolytic capacitor were produced.

Example 2

For Example 2, a solid electrolytic capacitor was produced in the same manner as Example 1, except that a metal film made of titanium and having an average thickness of 120 nm, was formed by vapor deposition on the surface of the tantalum particles. The solid electrolytic capacitor produced had a rated current of 16 V; and was 7.3 mm in length, 4.3 mm in width, and 2.0 mm in height. For the present example, 30 pieces of the solid electrolytic capacitor were produced.

Comparative Example 1

For Comparative Example 1, a solid electrolytic capacitor was produced in the same manner as Example 1, except that a metal film made of titanium was not formed on the surface of the tantalum particles; and hydrothermal reaction was not performed. The solid electrolytic capacitor produced had a rated current of 16 V; and was 7.3 mm in length, 4.3 mm in width, and 2.0 mm in height. For the present example, 30 pieces of the solid electrolytic capacitor were produced.

Comparative Example 2

For Comparative Example 2, a solid electrolytic capacitor was produced in the same manner as Example 1, except that titanium particles having an average particle size of 30 µm were used as the metal particles for the anode element; and hydrothermal reaction was not performed. The solid electrolytic capacitor produced had a rated current of 16 V; and was 7.3 mm in length, 4.3 mm in width, and 2.0 mm in height. For the present example, 30 pieces of the solid electrolytic capacitor were produced. The average particle size was measured by using a laser diffraction particle size analyzer.

[Performance Evaluation]
(Capacitance)

For the solid electrolytic capacitor of each of Examples 1 and 2 and Comparative Examples 1 and 2, ten pieces were picked out and then measured for capacitance (µF) at a frequency of 120 Hz, by using a LCR meter for four-terminal measurements. Then, the obtained values were averaged out. The results are shown under "capacitance (µF)" in Table 1.

(Leakage Current)

For the solid electrolytic capacitor of each of Examples 1 and 2 and Comparative Examples 1 and 2, ten pieces were picked out. A rated voltage was applied to the ten pieces for two minutes, and thereafter, their leakage current amounts were measured. Then, the obtained values were averaged out. The results are shown under "leakage current (μA)" in Table 1.

TABLE 1

| | capacitance (μF) | leakage current (μA) |
|---|---|---|
| Ex. 1 | 199.5 | 31.2 |
| Ex. 2 | 608 | 288.2 |
| Comp. Ex. 1 | 38 | 6 |
| Comp. Ex. 2 | 602 | 8600 |

With reference to Table 1, it was found that the solid electrolytic capacitors of Examples 1 and 2 both had higher capacitances than that of Comparative Example 1. This is presumably because of an improved dielectric constant of the dielectric film, due to the film having a $BaTiO_3$ film therein.

Comparing Example 1 with Example 2, the solid electrolytic capacitor of Example 1 had a lower capacitance than that of Example 2. This is presumably because of a further improved dielectric constant of the dielectric film, due to the $BaTiO_3$ film in Example 2 being thick. On the other hand, the solid electrolytic capacitor of Example 1 had a smaller leakage current amount than that of Example 2. Although the reason for the foregoing is not clear, it is presumed that cracks occurred in the $BaTiO_3$ film when it became thick, due to the high crystallinity of the film. Moreover, it is presumed that increase in leakage current is caused by materials of the $BaTiO_3$ film.

Comparing Examples 1 and 2 with Comparative Example 2, the solid electrolytic capacitor of Comparative Example 2 had a higher capacitance, but had a significantly large leakage current amount. Thus, it can be understood that making the dielectric film have a two-layer structure is necessary for the solid electrolytic capacitor to improve in performance.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The present invention can be widely used for a solid electrolytic capacitor and a method for producing the same.

EXPLANATION OF REFERENCE NUMERALS 10 capacitor element
11 anode element
12 anode lead
13 dielectric film
14 solid electrolytic layer
15 carbon layer
16 silver paint layer
17 anode terminal
18 adhesion layer
19 cathode terminal

The invention claimed is:

1. A solid electrolytic capacitor comprising:
an anode element comprising tantalum or niobium;
a dielectric film disposed on a surface of the anode element; and
a solid electrolytic layer disposed on the dielectric film, the dielectric film comprising:
a first dielectric film comprising an oxide of the tantalum or niobium formed on the surface of the anode element; and
a second dielectric film comprising a composite metal oxide having a perovskite structure formed on the first dielectric film,
wherein the second dielectric film is partially formed on the first dielectric film, and
the solid electrolytic layer is in contact with each of the first dielectric film not covered with the second dielectric film, and the second dielectric film.

2. The solid electrolytic capacitor in accordance with claim 1, wherein the composite metal oxide having a perovskite structure is barium titanate.

3. A method for producing a solid electrolytic capacitor, the method comprising the steps of:
making an anode element comprising tantalum or niobium;
forming, on a surface of the anode element, at least one of a metal film comprising titanium, and a metal oxide film comprising an oxide of titanium;
subjecting the anode element to chemical conversion treatment, thereby to form a first dielectric film comprising an oxide of the tantalum or niobium on the surface of the anode element;
subjecting the anode element to hydrothermal reaction so that the metal film or the metal oxide film converts to a composite metal oxide, thereby to form a second dielectric film comprising the composite metal oxide containing the titanium; and
forming a solid electrolytic layer on the dielectric film comprising the first and second dielectric films.

4. A method for producing a solid electrolytic capacitor, the method comprising the steps of:
forming, on a surface of particles of a powder of tantalum or niobium, at least one of a metal film comprising titanium, and a metal oxide film comprising an oxide of titanium;
sintering the powder of the tantalum or niobium having the metal film or the metal oxide film, thereby to make an anode element having thereon the metal film or the metal oxide film;
subjecting the anode element to chemical conversion treatment, thereby to form a first dielectric film comprising an oxide of the tantalum or niobium on a surface of the anode element;
subjecting the anode element to hydrothermal reaction so that the metal film or the metal oxide film converts to a composite metal oxide, thereby to form a second dielectric film comprising the composite metal oxide containing the titanium; and
forming a solid electrolytic layer on the dielectric film comprising the first and second dielectric films.

5. The method for producing the solid electrolytic capacitor in accordance with claim 3, wherein the composite metal oxide has a perovskite structure.

6. The method for producing the solid electrolytic capacitor in accordance with claim 3, wherein the composite metal oxide is barium titanate.

7. The method for producing the solid electrolytic capacitor in accordance with claim 3, wherein the metal film or the metal oxide film is formed such that the film partially covers the surface of the anode element.

8. The method for producing the solid electrolytic capacitor in accordance with claim 3, wherein the anode element is subjected to chemical conversion treatment after having undergone hydrothermal reaction.

9. The method for producing the solid electrolytic capacitor in accordance with claim 4, wherein the composite metal oxide has a perovskite structure.

10. The method for producing the solid electrolytic capacitor in accordance with claim 4, wherein the composite metal oxide is barium titanate.

11. The method for producing the solid electrolytic capacitor in accordance with claim 4, wherein the metal film or the metal oxide film is formed such that the film partially covers the surface of the particles.

12. The method for producing the solid electrolytic capacitor in accordance with claim 4, wherein the anode element is subjected to chemical conversion treatment after having undergone hydrothermal reaction.

13. A method for producing a solid electrolytic capacitor, the method comprising the steps of:
    making an anode element comprising a first metal;
    forming, on a surface of the anode element, at least one of a metal film comprising a second metal different from the first metal, and a metal oxide film comprising an oxide of the second metal;
    subjecting the anode element to hydrothermal reaction so that the metal film or the metal oxide film converts to a composite metal oxide, thereby to form a second dielectric film comprising the composite metal oxide containing the second metal;
    after formation of the second dielectric film, subjecting the anode element to chemical conversion treatment so that the first metal of the surface part of the anode element converts to an oxide, thereby to form a first dielectric film comprising the oxide of the first metal; and
    forming a solid electrolytic layer on the dielectric film comprising the first and second dielectric films.

14. The method for producing the solid electrolytic capacitor in accordance with claim 13, wherein the first metal is tantalum or niobium, and the second metal is titanium.

15. The method for producing the solid electrolytic capacitor in accordance with claim 13, wherein the composite metal oxide has a perovskite structure.

16. The method for producing the solid electrolytic capacitor in accordance with claim 13, wherein the composite metal oxide is barium titanate.

17. The method for producing the solid electrolytic capacitor in accordance with claim 13, wherein the metal film or the metal oxide film is formed such that the film partially covers the surface of the anode element.

* * * * *